July 8, 1930.  H. Y. NORWOOD  1,770,005
APPARATUS FOR MAKING GLASS TUBING
Filed Jan. 9, 1928
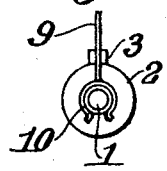
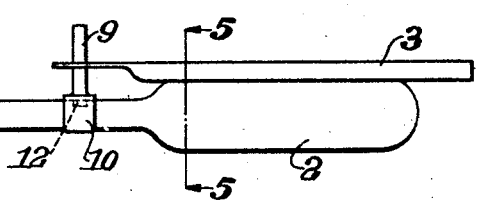
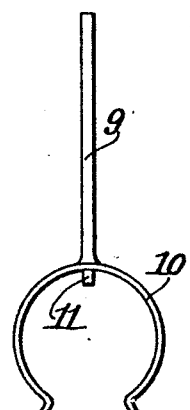
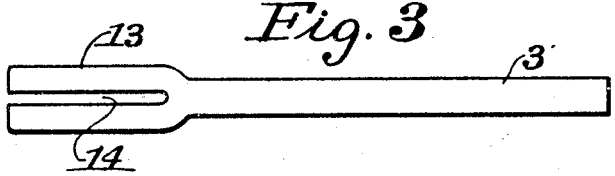
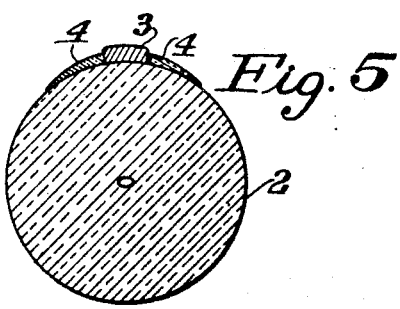
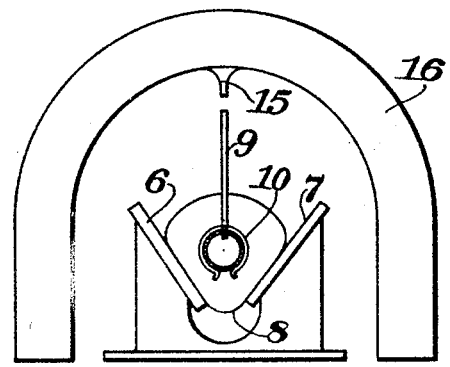
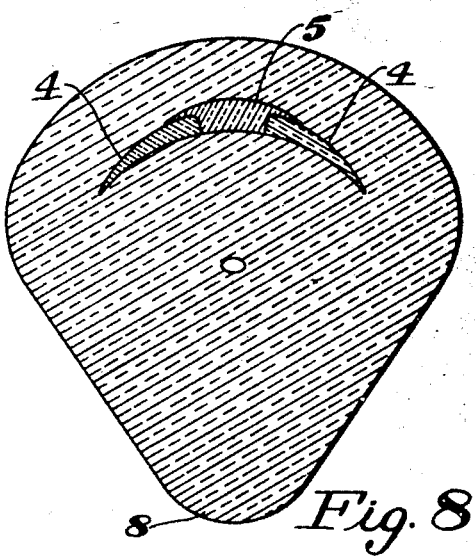
INVENTOR:
Harry Y. Norwood
BY
Alfred E. Burger,
his ATTORNEY Patented July 8, 1930

1,770,005

UNITED STATES PATENT OFFICE

HARRY Y. NORWOOD, OF WEST RUSH, NEW YORK, ASSIGNOR TO TAYLOR INSTRUMENT COMPANIES, OF ROCHESTER, NEW YORK, A CORPORATION OF NEW YORK

APPARATUS FOR MAKING GLASS TUBING

Application filed January 9, 1928. Serial No. 245,311.

This invention relates to thermometers and more in particular to a process of making glass tubing for the manufacture of thermometers.

In the manufacture of glass tubing embodying lens fronts and colored stripes it has heretofore been difficult to dimension and position the stripes so as to assume in the finished product a desired predetermined relationship to the bore and the column of liquid therein.

It is the principal object of the invention to provide an apparatus for making glass tubing of the character referred to, whereby the difficulties mentioned are substantially eliminated and the finished product is more uniform than it was heretofore possible to produce.

For a full explanation of the invention, the principle of operation upon which it is based, its execution and its advantages, reference is made to the accompanying drawings, wherein Fig. 1 is an elevation of apparatus forming important parts of my invention;

Fig. 2 is an end view thereof;

Fig. 3 is an enlarged plan view of a part shown in Figs. 1 and 2;

Fig. 4 is an enlarged end view of another part shown in Figs. 1 and 2;

Fig. 5 is an enlarged cross-section taken on line 5—5, Fig. 1;

Fig. 6 is a similar view showing a subsequent stage in the execution of the invention;

Fig. 7 is a diagrammatic view of mechanism for providing glass tubing with a lens front; and Fig. 8 is an enlarged cross-section of the finished tubing.

In the drawings 1 represents a blow pipe of the type commonly used for glass blowing.

A mass of molten glass, according to the usual practice, is picked up by the blow pipe and after air is blown into it, it is shaped by turning of the pipe and by rolling of the body of glass on a plane surface to give it a circular cross-section and to symmetrically dispose the air bubble. The body of the glass 2 in Figs. 1 and 2 represents a cylindrical body of glass as the result of such rolling operation.

In some of the tubing is embedded a colored stripe. To obtain the best results and a uniform product, it is desirable that the stripe be given a definite width depending upon the size of the bore of the tube and the distance of the stripe from the bore. Heretofore the width of the stripe in the finished product did not always correspond to that desired. In some cases it was too large, in other cases too small. At any rate it depended on the skill of the workman.

In order to obtain a stripe of the desired width, I make use of a templet 3 of suitable material such as metal. This templet is made of a width to cover a definite part of the surface of the glass body 2. When the templet is in position, as indicated in Figs. 1, 2 and 5, enamel 4 of any desired color, say white enamel, is applied on both sides of the templet. After the application of the enamel 4, the templet is removed and an enamel 5 of different color, say red enamel, is applied to fill the space left by the withdrawal of the templet. (Fig. 6.)

It is thus obvious that when once the width of the templet is determined relatively to a body of glass of definite dimensions and an air bubble of definite dimensions, it is possible to reproduce tubing in which the width of the stripe 5 of enamel is always the same and in proper visual relation to the bore of the tube.

After the stripes 4 and 5 of enamel have been applied as described, another layer of clear glass is gathered around the body of glass as indicated in Fig. 8. However, in order to give the glass the cross-sectional configuration shown in Fig. 8, it is necessary to subject it to another shaping operation, generally referred to as "lensing". This operation is illustrated in Fig. 7 wherein two steel plates 6 and 7 are inclined toward each other similar to the letter V, but open at the bottom. The mass of glass on the blow pipe is placed into the trough-like space and moved lengthwise thereof to gradually shape it and at the same time polish the sides while allowing the lower portion to protrude into the open space and receive what is called an air or fire polish. Due to the surface tension the protruding portion is given a lenticular surface 8 which, like all the other geometrical characteristics, is maintained during the drawing operation except in size.

My invention more particularly comprises means whereby the application of the enamel, and the lensing operation are so correlated as to produce a uniform result. To this end I provide an arm 9 and means for quickly attaching it to and removing it from the blow pipe 1. While there is considerable latitude in regard to the selection of means for this purpose, I prefer to combine the arm 9 with a spring ring clamp 10 adapted to readily spring over the blow pipe. Centrally of the ring clamp 10 I provide a tenon 11 to take into a corresponding recess 12 in the blow pipe, as indicated in Fig. 1.

The significance of arm 9 is as follows:

When the glass body is ready for the application of the enamel, the ring clamp is slipped over the blow pipe to assume the radial position shown in Fig. 1. Then the templet 3 is placed on the glass so that it is in alignment with the arm 9. I prefer to have at the end of the templet a member 13 provided with a slot 14. When the templet is moved so as to enter into engagement with the arm 9 in the slot 14, the templet is bound to assume a definite position, the sides of the arm 9 serving as guides; the arm 9 thus dictates the position of the templet.

When the body of glass is ready for the lensing operation, the arm 9 is again attached, as shown in Fig. 7. The lensing means has associated with it a reference point 15, which may be conveniently provided on the housing 16 surrounding the plates 6 and 7, or in any other suitable manner. The mass of glass on the blow pipe is so placed into the trough defined by the plates 6 and 7 that the arm 9 is in alignment with the reference point 15. Since the enamel stripe 5 is in alignment with the arm 9 and since the lens surface 8 is formed in alignment with the arm 9, and since the air bubble is located between stripe 5 and the lens front 8, all three must be in strict alignment, as was intended. All guess work is eliminated. Skill is no longer a factor, aside entirely from the fact that skill is an unreliable variable.

While I have described what I consider as the preferred embodiment of my invention, it should be understood that the invention may be carried out in many other ways to bring about the desired correlationship between the application of templet 3 and the lensing means.

I claim:

1. Apparatus for making glass tubing, including a blow pipe, an arm, means for attaching the arm to the blow pipe to assume a fixed radial position thereon and a templet having at one end means for engagement with the arm to establish axial alignment of the templet relatively to the said arm and the blow pipe.

2. Apparatus for making glass tubing, including a blow pipe, an arm and means for attaching the arm to the blow pipe to assume a fixed radial position thereon, said means including a member movable into and out of connection with the blow pipe in a fixed relative relation thereto and being constructed to receive the said arm in a definite relation.

3. Apparatus for making glass tubing, including a blow pipe, an arm and means for attaching the arm to the blow pipe to assume a fixed radial position thereon, said means including a member movable into and out of connection with the blow pipe in a fixed angular relation thereto and containing means for holding the said arm in a definite position of axial alignment with the blow pipe.

4. Apparatus for making glass tubing, including a blow pipe, an arm, means for attaching the arm to the blow pipe to assume a definite radial position thereon, means for lensing a body of glass and means associated with the lensing means for visual cooperation with the arm on the blow pipe to position the body of glass relatively to the lensing means.

5. Apparatus for making glass tubing, including a blow pipe, a templet and means attachable to and removable from the blow pipe in a definite angular relation thereto and containing provision for bringing the templet into a fixed axial alignment with the blow pipe.

6. Apparatus for making glass tubing, including a blow pipe, means for lensing a body of glass, an arm, means for attaching the arm to the blow pipe to assume a definite radial position thereon and means associated with the lensing means, establishing a point of reference for bringing a body of glass on the blow pipe into a definite relation to the lensing means, said arm being constructed and arranged to permit quick attachment and quick removal.

7. Apparatus for making glass tubing, including a blow pipe, an arm, means for attaching the arm to the blow pipe to assume a definite radial position, a templet for covering a portion of the surface of a mass of glass on the blow pipe, means on the templet for positioning the latter in a definite relation to the arm on the blow pipe, means for lensing a body of glass on the blow pipe and means associated with the lensing means and visually cooperating with said arm for positioning the body of glass in a definite relation to the lensing means.

In testimony whereof I affix my signature.

HARRY Y. NORWOOD.